(12) United States Patent
Guo et al.

(10) Patent No.: US 11,361,334 B2
(45) Date of Patent: Jun. 14, 2022

(54) ARTICLE ESTIMATION METHOD AND APPARATUS

(71) Applicant: Advanced New Technologies Co., Ltd., Grand Cayman (KY)

(72) Inventors: Yufeng Guo, Hangzhou (CN); Bin Wang, Hangzhou (CN); Yahui Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/691,290

(22) Filed: Nov. 21, 2019

(65) Prior Publication Data

US 2020/0090201 A1 Mar. 19, 2020

Related U.S. Application Data

(63) Continuation of application No. PCT/CN2018/098247, filed on Aug. 2, 2018.

(30) Foreign Application Priority Data

Aug. 4, 2017 (CN) .......................... 201710659600.2

(51) Int. Cl.
*G06Q 30/02* (2012.01)
*G06Q 50/10* (2012.01)
(Continued)

(52) U.S. Cl.
CPC ......... *G06Q 30/0206* (2013.01); *G06Q 10/30* (2013.01); *G06Q 30/02* (2013.01);
(Continued)

(58) Field of Classification Search
CPC .. G06Q 10/30; G06Q 20/208; G06Q 30/0237; Y02W 30/82; G07F 7/06
See application file for complete search history.

(56) References Cited

U.S. PATENT DOCUMENTS 7,881,965 B2 2/2011 Bowles et al.
9,672,543 B1 * 6/2017 Yost .................. G06Q 30/0623
(Continued)

FOREIGN PATENT DOCUMENTS

CN 102592237 7/2012
CN 103765455 4/2014
(Continued)

OTHER PUBLICATIONS

Artun, "predictive marketing: customer analytics and big data" (Year: 2015).*

(Continued)

*Primary Examiner* — Sangeeta Bahl
(74) *Attorney, Agent, or Firm* — Fish & Richardson P.C.

(57) ABSTRACT

A server receives article information of an article to be estimated from a user. The server obtains an actual picture of the article from the user. The server determines a standard picture of the article from a predetermined graphics library based on the article information. The server obtains an actual performance of the article. The server determines a value of the article based on the standard picture, the actual picture, and the actual performance of the article.

19 Claims, 8 Drawing Sheets

(51) Int. Cl.
*G06Q 10/00* (2012.01)
*G06T 7/00* (2017.01)

(52) U.S. Cl.
CPC ..... *G06Q 30/0201* (2013.01); *G06Q 30/0278* (2013.01); *G06Q 50/10* (2013.01); *G06T 7/97* (2017.01)

(56) References Cited

U.S. PATENT DOCUMENTS

| | | | | |
|---|---|---|---|---|
| 9,911,102 | B2* | 3/2018 | Bowles | G06Q 10/30 |
| 9,972,035 | B2* | 5/2018 | Yost | G06Q 30/0283 |
| 10,417,615 | B2* | 9/2019 | Bowles | G06Q 20/306 |
| 10,860,990 | B2* | 12/2020 | Bowles | H04M 1/0287 |
| 2010/0076794 | A1* | 3/2010 | Seippel | G06Q 40/08 705/28 |
| 2015/0127430 | A1* | 5/2015 | Hammer, III | G06Q 30/0206 705/7.35 |
| 2015/0339736 | A1* | 11/2015 | Bennett | G06Q 30/0278 705/306 |
| 2016/0012503 | A1* | 1/2016 | Fu | G06Q 50/01 705/26.4 |
| 2016/0098689 | A1* | 4/2016 | Bowles | G06Q 10/30 705/23 |
| 2016/0284019 | A1* | 9/2016 | Bowles | G06Q 20/18 |
| 2017/0323279 | A1* | 11/2017 | Dion | G07F 19/20 |

FOREIGN PATENT DOCUMENTS

| | | |
|---|---|---|
| CN | 104881926 | 9/2015 |
| CN | 105223432 | 1/2016 |
| CN | 105336045 | 2/2016 |
| CN | 105359194 | 2/2016 |
| CN | 105809821 | 7/2016 |
| CN | 205608792 | 9/2016 |
| CN | 106600421 | 4/2017 |
| CN | 106600822 | 4/2017 |
| CN | 106997491 | 8/2017 |
| CN | 107451868 | 12/2017 |
| JP | 2003196548 | 7/2003 |
| JP | 2004342053 | 12/2004 |
| JP | 200865474 | 3/2008 |
| JP | 4919197 | 4/2012 |
| JP | 2013531823 | 8/2013 |
| JP | 2014513829 | 6/2014 |
| JP | 2014215930 | 11/2014 |
| JP | 5745680 | 7/2015 |
| JP | 20164470 | 1/2016 |
| KR | 101145293 | 5/2012 |
| KR | 101540707 | 8/2015 |
| KR | 20170036126 | 3/2017 |
| TW | 200807317 | 2/2008 |
| WO | WO 2013065456 | 5/2013 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Extended European Search Report in European Application No. 18842216.6, dated Jan. 3, 2020, 9 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/098247, dated Oct. 31, 2018, 11 pages (with partial English translation).

PCT International Preliminary Reporton Patentability in International Appln No. PCT/CN2018/098247, dated Feb. 4, 2020, 13 pages (with English translation).

* cited by examiner

ARTICLE ESTIMATION METHOD AND APPARATUS

CROSS REFERENCE TO RELATED APPLICATIONS

This application is a continuation of PCT Application No. PCT/CN2018/098247, filed on Aug. 2, 2018, which claims priority to Chinese Patent Application No. 201710659600.2, filed on Aug. 4, 2017, and each application is hereby incorporated by reference in its entirety.

TECHNICAL FIELD

The present specification relates to the field of computer technologies, and in particular, to an article estimation method and apparatus.

BACKGROUND

With continuous development of computer technologies, services such as article recycling, article pledge, and article transfer are gradually transferred from an offline mode to an online mode, so that users can conveniently and rapidly handle these services online. As such, efficiency of executing these services is greatly improved.

When a user handles a service such as article recycling or article pledge, article estimation is usually needed. Currently, articles are usually estimated manually.

Based on the existing technology, a more efficient article estimation method is needed.

SUMMARY

The present specification provides an article estimation method, to alleviate a problem of low article estimation efficiency in the existing technology.

The present specification provides an article estimation method, including: receiving article information of an article to be estimated, and obtaining an actual picture of the article to be estimated; determining a standard picture of the article to be estimated from a predetermined graphics library based on the article information; and estimating the article to be estimated based on the standard picture and the actual picture.

The present specification provides an article estimation apparatus, to alleviate a problem of low article estimation efficiency in the existing technology.

The present specification provides an article estimation apparatus, including: a receiving module, configured to receive article information of an article to be estimated, and obtain an actual picture of the article to be estimated; a determining module, configured to determine a standard picture of the article to be estimated from a predetermined graphics library based on the article information; and an estimation module, configured to estimate the article to be estimated based on the standard picture and the actual picture.

The present specification provides an article estimation device, to alleviate a problem of low article estimation efficiency in the existing technology.

The present specification provides an article estimation device, including one or more memories and processors, where the memory stores a program, and the program is executed by the one or more processors to perform the following steps: receiving article information of an article to be estimated, and obtaining an actual picture of the article to be estimated; determining a standard picture of the article to be estimated from a predetermined graphics library based on the article information; and estimating the article to be estimated based on the standard picture and the actual picture.

The present specification provides a service execution method, to alleviate a problem of low service execution efficiency in the existing technology.

The present specification provides a service execution method, including: receiving article information that is of an article to be estimated and that is sent by a user, and obtaining an actual picture of the article to be estimated; determining a standard picture of the article to be estimated from a predetermined graphics library based on the article information; estimating the article to be estimated based on the standard picture and the actual picture; and executing a service based on a credit limit of the user and an estimated price of the article to be estimated.

The present specification provides a service execution apparatus, to alleviate a problem of low service execution efficiency in the existing technology.

The present specification provides a service execution apparatus, including: an acquisition module, configured to receive article information that is of an article to be estimated and that is sent by a user, and obtain an actual picture of the article to be estimated; a determining module, configured to determine a standard picture of the article to be estimated from a predetermined graphics library based on the article information; an estimation module, configured to estimate the article to be estimated based on the standard picture and the actual picture; and an execution module, configured to execute a service based on a credit limit of the user and an estimated price of the article to be estimated.

The present specification provides a service execution device, to alleviate a problem of low service execution efficiency in the existing technology.

The present specification provides a service execution device, including one or more memories and processors, where the memory stores a program, and the program is executed by the one or more processors to perform the following steps: receiving article information that is of an article to be estimated and that is sent by a user, and obtaining an actual picture of the article to be estimated; determining a standard picture of the article to be estimated from a predetermined graphics library based on the article information; estimating the article to be estimated based on the standard picture and the actual picture; and executing a service based on a credit limit of the user and an estimated price of the article to be estimated.

The at least one technical solution used in the present specification can achieve the following beneficial effects:

In one or more implementations of the present specification, the standard picture of the article to be estimated can be determined from the predetermined graphics library based on the received article information of the article to be estimated, and the article to be estimated is estimated based on the obtained actual picture of the article to be estimated and the determined standard picture. The article to be estimated can be rapidly estimated by comparing and analyzing the actual picture and the standard picture after the actual picture and the standard picture of the article to be estimated are obtained, thereby improving article estimation efficiency.

BRIEF DESCRIPTION OF DRAWINGS

The accompanying drawings described here are intended to help further understand the present specification, and constitute a part of the present specification. The illustrative implementations of the present specification and descriptions thereof are intended to describe the present specification, and constitute no improper limitation on the present specification. In the accompanying drawings.

BRIEF DESCRIPTION OF IMPLEMENTATIONS

In the existing technology, articles are usually estimated manually. To be specific, an article estimation person needs to manually check an article to be estimated from every aspect after obtaining the article to be estimated, to estimate a price of the article to be estimated, and pays an amount to a user based on the estimated price.

The present specification provides an article estimation method. In the method, a standard picture of an article to be estimated can be determined from a predetermined graphics library based on received article information of the article to be estimated, and the article to be estimated is estimated based on an obtained actual picture of the article to be estimated and the determined standard picture. The article to be estimated can be rapidly estimated by comparing and analyzing the actual picture and the standard picture after the actual picture and the standard picture of the article to be estimated are obtained, thereby improving article estimation efficiency.

To make a person skilled in the art understand the technical solutions in one or more implementations of the present specification better, the following describes the technical solutions in the one or more implementations of the present specification with reference to the accompanying drawings in the one or more implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

In the present specification, an article can be estimated by a server, an end-user device, or an article estimation system, and certainly can be estimated by an article estimation client. The article estimation method provided in the present specification is described below by using an example in which a server serves as an execution body. The article estimation method provided in the present specification can be used in a plurality of scenarios such as article recycling, article pledge, article transfer, article damage assessment, and article insurance compensation. To facilitate description of the article estimation method provided in the present specification, the article estimation method provided in the present specification is described in detail only in the article recycling scenario. For application of the article estimation method in other scenarios, references can be made to the article recycling scenario.

Figure 1:
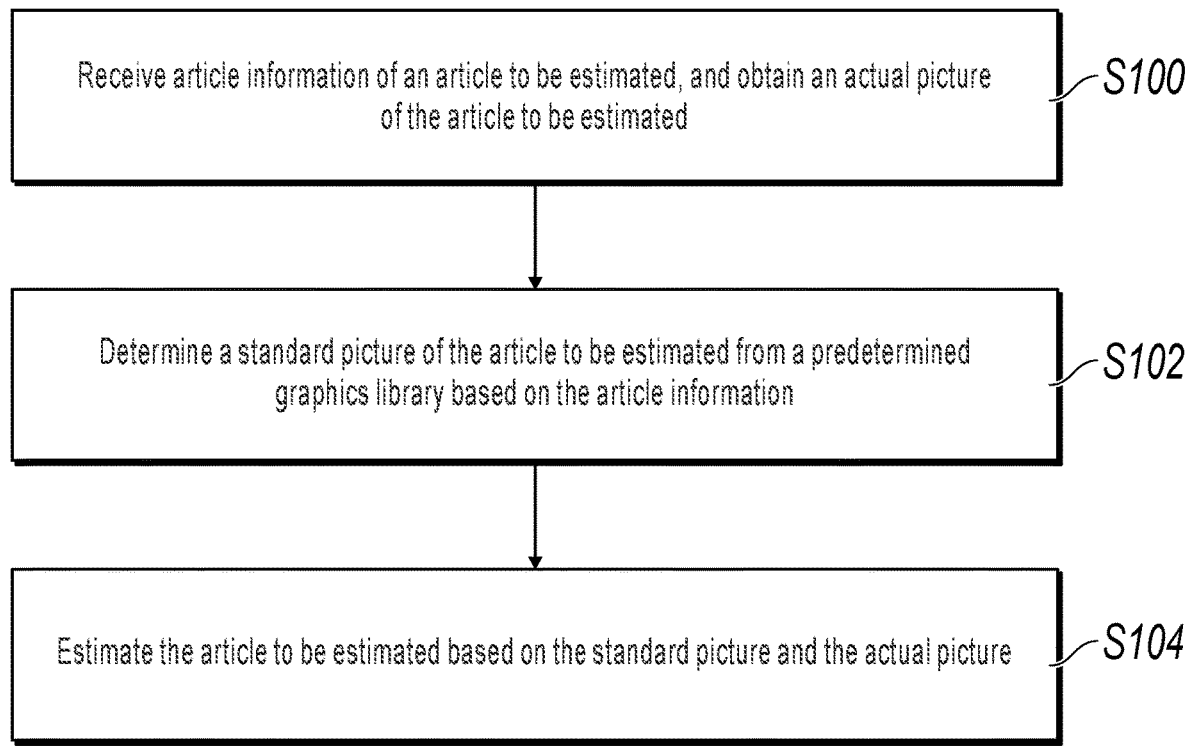
FIG. 1 is a schematic diagram illustrating an article estimation process, according to the present specification.

FIG. 1 is a schematic diagram illustrating an article estimation process, according to the present specification. The process includes the following steps.

S100. Receive article information of an article to be estimated, and obtain an actual picture of the article to be estimated.

In the present specification, when executing an article recycling service, a user can input, to an end-user device or a client installed in the end-user device, article information of an article that needs to be recycled. The end-user device or the client can send, to a server, the article information input by the user, so that when receiving the article information, the server determines, based on the article information, the article that is of the user and that needs to be recycled, namely, an article to be estimated.

After determining the article to be estimated, the server can prompt, by using the end-user device or the client of the user, the user to collect an actual picture of the article to be estimated, and can further prompt the user with some angles from which the user needs to collect actual pictures of the article to be estimated. The actual picture mentioned here is a picture that can reflect a current real status of the article to be estimated, and surface conditions such as whether a scratch exists on the surface of the article to be estimated and whether a disassembly trace exists on the surface of the article to be estimated can be reflected in the actual picture.

The user can collect actual pictures of the article to be estimated from a plurality of angles by using the end-user device. For example, the user may collect actual pictures from the front, the side, and the back of the article to be estimated. The user can send the collected actual picture of the article to be estimated to the server by using the end-user device or the client, so that the server subsequently estimates the article to be estimated based on the obtained actual picture of the article to be estimated.

In the present specification, the server can determine whether the actual picture of the article to be estimated satisfies a specified condition, and return a prompt message to the end-user device or the client of the user when determining that the actual picture of the article to be estimated does not satisfy the specified condition, to prompt the user to collect a new actual picture of the article to be estimated. For example, when determining that definition of the obtained actual picture of the article to be estimated does not satisfy specified definition, the server prompts the user to collect a new actual picture of the article to be estimated.

S102. Determine a standard picture of the article to be estimated from a predetermined graphics library based on the article information.

The server can determine the standard picture of the article to be estimated from the predetermined graphics library based on the received article information of the article to be estimated. The predetermined graphics library includes standard pictures of a plurality of articles from various angles. The standard pictures of the articles can be collected in advance and stored in the predetermined graphics library. The standard picture mentioned here can be a picture of the article in a certain state. For example, the standard picture can be a picture of the article in an intact state, or can be a picture in which a scratch exists on the surface of the article or a picture in which a disassembly trace exists on the surface of the article. A specific type of the standard picture (to be specific, whether the standard picture is a picture that reflects that the article is intact or a picture that reflects various damage statuses of the article) depends on how to subsequently estimate the article to be estimated based on the standard picture and the actual picture.

S104. Estimate the article to be estimated based on the standard picture and the actual picture.

The server can compare and analyze the obtained actual picture of the article to be estimated and the standard picture of the article to be estimated, to estimate the article to be estimated. In the present specification, for each actual picture of the to-be-estimated article, the server can determine a standard picture corresponding to the actual picture from determined standard pictures of the article to be estimated. For example, for an actual picture collected from the front of the article to be estimated, the server can determine a standard picture collected from the front of the article to be estimated. The server can input the actual picture and the standard picture corresponding to the actual picture to a pre-trained model, to determine damage assessment information of the article to be estimated by using the model.

When the standard picture is the picture of the article in the intact state, the model can obtain a corresponding comparison result by comparing and analyzing the actual picture and the standard picture. The comparison result can reflect whether there is a difference between the surface of the article to be estimated and a surface of the intact article in the standard picture. The model can further determine a type of the difference between the surface of the article to be estimated and the surface of the intact article in the standard picture based on the obtained comparison result (for example, the type is a scratch, damage, or a disassembly trace), and then determine the damage assessment information of the article to be estimated.

When the standard picture is the picture that reflects the various damage statuses of the article, the server can perform similarity analysis on the actual picture and the standard picture corresponding to the actual picture, to determine whether the article to be estimated is damaged and a damage status. The actual picture collected from the front of the article to be estimated is used as an example. The server can sequentially perform similarity analysis on the actual picture and three standard pictures that are determined from the predetermined graphics library and in which a disassembly trace, a scratch, and a water mark respectively exist on the front of the article to be estimated, to determine whether the three types of damage exist on the front of the article to be estimated. By analogy, the server can determine a damage status of every side of the article to be estimated in this way, and then determine the damage assessment information of the article to be estimated.

In the present specification, the damage assessment information includes information about whether a scratch, damage, or a disassembly trace exists on the article to be estimated. The server can estimate the article to be estimated based on the information included in the damage assessment information.

The server stores predetermined estimated prices of articles. The predetermined estimated price is a price of an article to be estimated when the article to be estimated is intact. The predetermined estimated prices of the articles can be determined manually based on actual situations and stored in the server. Various damage statuses such as a scratch and a disassembly trace on a surface of an article correspond to different damage prices. Likewise, these damage prices can also be determined manually based on actual situations.

Based on the previous descriptions, after determining the damage assessment information of the article to be estimated, the server can determine various types of damage statuses of the article to be estimated based on the damage assessment information, and then determine an estimated price of the article to be estimated based on a predetermined estimated price of the article to be estimated and damage prices corresponding to the various types of damage statuses.

For example, assume that damage assessment information that is of article A to be estimated and that is determined by the server records information that a scratch, a disassembly trace, and a water mark exist on the article to be estimated. The server can separately determine damages prices a, b, and c respectively corresponding to the three types of damage statuses: the scratch, the disassembly trace, and the water mark, and determine predetermined estimated price S of article A to be estimated, and then sequentially subtract a, b, and c from predetermined estimated price S to obtain an estimated price of article to be estimated A.

It is worthwhile to note that some articles such as an electronic device need to be estimated based on actual performance of these articles in addition to surface conditions of the articles. Therefore, in the present specification, when the article to be estimated is an electronic device, the server needs to obtain evaluation information of the article to be estimated in addition to the actual picture of the article to be estimated. The evaluation information can be obtained by using evaluation software such as benchmark software.

In the present specification, the server can send an installation package corresponding to the evaluation software to the article to be estimated (when the article to be estimated is an electronic device), so that the article to be estimated installs the corresponding evaluation software by using the installation package, and then obtains the evaluation information of the article to be estimated by running the evaluation software, for example, obtains a score obtained by running the benchmark software. The article to be estimated can obtain the installation package of the evaluation software from the server by accessing the server. Alternatively, the user can obtain installation package information, such as a quick response code and a uniform resource locator (URL), of the evaluation software from the server by using the end-user device, and the article to be estimated can obtain the installation package of the evaluation software based on the installation package information that is of the evaluation software and that is obtained by the end-user device.

Certainly, the article to be estimated can obtain the installation package of the evaluation software from the server in other many ways. Details are omitted here for simplicity. After obtaining the evaluation information of the article to be estimated, the server can comprehensively determine an estimated price of the article to be estimated based on the evaluation information, the standard picture and the actual picture of the article to be estimated, and a surface condition and performance of the article to be estimated. The server can comprehensively determine the estimated price of the article to be estimated in a plurality of ways. For example, the server can determine an estimated price of the article to be estimated based on the obtained evaluation information of the article to be estimated, and then determine another estimated price of the article to be estimated based on the standard picture and the actual picture of the article to be estimated. The server can use an average value of the two estimated prices as a final estimated price of the article to be estimated.

For another example, the server stores benchmark evaluation information of articles. The benchmark evaluation information can be manually determined based on actual situations. The benchmark evaluation information can reflect benchmark performance of an article. Based on the previous descriptions, after obtaining the evaluation information of the article to be estimated, the server can compare benchmark performance and actual performance of the article to be estimated based on benchmark evaluation information of the article to be estimated and the obtained evaluation information. When determining that the actual performance of the article to be estimated is higher than the benchmark performance, the server can add a specific amount to the estimated price determined based on the standard picture and the actual picture of the article to be estimated, to obtain a final estimated price of the article to be estimated. When determining that the actual performance of the article to be estimated is lower than the benchmark performance, the server can subtract a specific amount from the estimated price determined based on the standard picture and the actual picture of the article to be estimated, to obtain a final estimated price of the article to be estimated.

Certainly, the server can comprehensively determine the estimated price of the article to be estimated in another way based on the obtained evaluation information and the actual picture and the standard picture of the article to be estimated. Details are omitted here for simplicity.

It is worthwhile to note that in addition to obtaining the evaluation information of the article to be estimated by using a picture that is about the evaluation information of the article to be estimated and that is collected by the end-user device of the user, the server can obtain the evaluation information in another way. For example, after obtaining the evaluation information by running the evaluation software, the article to be estimated can transmit the evaluation information to the end-user device of the user by using a data transmission method such as Bluetooth, infrared, or near field communication (NFC), so that the end-user device of the user sends the obtained evaluation information to the server.

For another example, after obtaining the evaluation information by running the evaluation software, the article to be estimated can upload the evaluation information to a cloud that is used to store data. The user can download the evaluation information from the cloud by using the end-user device, and then send the evaluation information to the server. Certainly, the server can obtain the evaluation information of the article to be estimated in another way. Details are omitted here for simplicity.

After estimating the article to be estimated, the server can execute an article recycling service based on the estimated price. The server can return the obtained estimated price to the end-user device or the client of the user for display. When detecting that the user determines to recycle the article to be estimated, the server can send a pickup message to a pickup party, to instruct the pickup party to pick up the article to be estimated from domicile based on an address of the user. The server can determine, based on a specified operation performed by the user on the end-user device or the client, whether to pick up the article to be estimated. For example, if the user taps a control of "determine to recycle" after viewing, by using the end-user device, the estimated price returned by the server, the end-user device can send, to the server, information indicating that the user determines to recycle the article to be estimated, and the server can determine, based on the information, that the article to be estimated needs to be picked up by the pickup party.

In the present specification, different recycling methods can be used for different users. For example, for a user with good credit, an article can be recycled by using a method of payment before review. To be specific, the server can instruct the pickup party to pick up the article from domicile, pay an amount less than an estimated price to the user first, and then pay a remaining part (namely, a balance payment) of the estimated price of the article to be estimated to the user when determining that the article to be estimated is reviewed. In the present specification, this method can be referred to as a first recycling method.

For a user with mediocre credit, an article can be recycled by using a method of review before payment. To be specific, the server can instruct the pickup party to pick up the article from domicile first, and then pay the user after determining that the article to be estimated is reviewed. If determining that the user is a risky user, the server ends the article recycling service. In the present specification, this method can be referred to as a second recycling method.

Therefore, before picking up the article to be estimated, the server can determine credit information of the user, and determine, based on the credit information of the user, whether to recycle the article to be estimated by using the first recycling method. The credit information of the user mentioned here can be information that can reflect a credit status of the user, for example, a credit limit of the user.

When determining that the credit limit of the user is not less than a specified credit limit, the server determines to recycle the article to be estimated by using the first recycling method, and then pays an amount less than the estimated price to the user before the article to be estimated is reviewed. The server can pay a specified part of the estimated price to the user based on a fixed proportion, for example, pay 70% of the estimated price to the user, or can determine, based on the credit limit of the user, a specific amount of the estimated price to be paid to the user. For example, assume that the specified credit limit is 700. When the credit limit of the user is 700, the server can first pay 70% of the estimated price to the user. When the credit limit of the user is 750, the server can first pay 80% of the estimated price to the user. When the credit limit of the user is 800, the server can first pay 90% of the estimated price to the user.

When determining that the credit limit of the user is less than the specified credit limit, the server determines not to recycle the article to be estimated by using the first recycling method, and further determines, based on information that can reflect a safety status of the user, such as identity information and risk control information of the user, whether the user is a risky user. When determining that the user is safe, the server can recycle the article to be estimated by using the second recycling method. If determining that the user is a risky user, the server ends the article recycling service.

In the present specification, the article to be estimated can be manually reviewed. After the server instructs the pickup party to pick up the article to be estimated, the pickup party can send the received article to be estimated to a reviewer. After receiving the article to be estimated, the reviewer reviews the article to be estimated from every aspect, to determine whether the estimated price that is of the article to be estimated and that is previously determined by the server satisfies an actual status. In other words, after receiving the article to be estimated, the reviewer determines an actual price of the article to be estimated based on the actual status of the article to be estimated, and determines whether the estimated price that is of the article to be estimated and that is previously determined by the server is consistent with the actual price. The server can determine, based on the actual price and a cause for the actual price that are input by the reviewer, whether the estimated price of the article to be estimated is consistent with the actual price. If yes, the server can pay a balance payment of the estimated price to the user. If no, the server can generate review information based on the actual price and the cause for the actual price, and send the review information to the user.

After viewing the review information, the user can choose whether to lodge an appeal. When determining that the user approves of the review information, the server determines an actual payment amount of the article to be estimated based on the actual price of the article to be estimated, and pays the user.

When the user lodges an appeal, the server can determine that the user disapproves of the review information, and the server can send information to a customer service representative, to instruct the customer service representative to contact the user for negotiation. When determining, based on a customer service record, that the user and the customer service representative agree on a price of the article to be estimated, the server pays the agreed price to the user. When determining, based on a customer service record, that the user and the customer service representative do not agree on a price of the article to be estimated, the server instructs the pickup party to return the article to be estimated to the user, and if the server has paid a part of amount of the estimated price to the user, the server deducts the part of amount from an account of the user.

In the present specification, the server may pay the user based on the actual price of the article to be estimated in the following several cases. In a first case, if the server has paid the specified part of the estimated price of the article to be estimated to the user, the server needs to further determine whether the actual price is greater than the amount previously paid to the user. When determining that the actual price is less than the specified part of the estimated price of the article to be estimated, the server can deduct, from the account of the user, a difference obtained by subtracting the actual price from the specified part of the estimated price, and then end the entire article recycling process. For example, assume that an estimated price of article B to be estimated is 100 RMB, an actual price of article B to be estimated is 50 RMB, and the server previously pays 70% (namely, 70 RMB) of the estimated price of article B to be estimated to a user. In this case, the server can deduct 20 RMB from an account of the user based on the actual price of article B to be estimated.

In a second case, when determining that the actual price of the article to be estimated is greater than the specified part of the estimated price of the article to be estimated, the server can pay a difference obtained by subtracting the specified part of the estimated price from the actual price to the user, and then end the entire article recycling process. For example, assume that an estimated price of article C to be estimated is 200 RMB, an actual price of article C to be estimated is 180 RMB, and the server previously pays 70% (namely, 140 RMB) of the estimated price of article C to be estimated to a user. In this case, the server can pay another 40 RMB to the user based on the actual price of article to be estimated C.

In a third case, if the server determines to recycle the article to be estimated by using the second recycling method (review before payment), the server can pay the actual price of the article to be estimated to the user, and then end the entire article recycling process.

It is worthwhile to note that in the entire article recycling process, the server can push a message about a current article recycling progress to the user when performing each step. For example, when instructing the pickup party to pick up the article from domicile, the server can notify, by pushing a message, the user that the pickup party is to pick up the article from domicile. For another example, when paying the specified part of the estimated price of the article to be estimated to the user, the server can notify, by pushing a message, the user that the part of amount of the estimated price is paid to the user. For another example, when paying the balance payment to the user based on the actual price of the article to be estimated, the server can notify the user by pushing a message. The balance payment mentioned here is a part by which the actual price of the article to be estimated is greater than the amount previously paid to the user. The server can enable, by pushing a message, the user to learn of each article recycling progress in real time, to facilitate real-time monitoring and follow-up by the user.

In the present specification, after completing the entire article recycling process, the server can update the credit information of the user for this time of article recycling. For example, the server can increase the credit limit and a credit score of the user to a certain degree based on this time of article recycling, and record this time of article recycling in the credit life of the user.

After the server sends the review information to the user, when detecting that the user still does not reply to the server based on the review information within a specified time, the server can automatically determine that the user approves of the actual price in the review information after detecting that the specified time expires, and then pay the user based on the actual price of the article to be estimated.

Certainly, when detecting that the user still does not reply to the server based on the review information within the specified time, the server can determine that the user defaults. In this case, the server deducts a specific amount when paying to the user based on the actual price of the article to be estimated. Alternatively, when determining that the user defaults, the server can take another penalty measure, for example, decreases the credit limit of the user to a certain degree.

In the present specification, in the process of executing the article recycling service, it can be determined whether the user signs a related agreement such as an entrusted deduction agreement or a default agreement. When it is determined that the user does not sign the agreement, the agreement can be displayed to the user for view by using the end-user device or the client, and when it is determined that the user signs the agreement, the article recycling service is executed. The server can display the agreement to the user before estimating the article to be estimated, or can display the agreement to the user when detecting that the user determines to execute the article recycling service based on the estimated price, or can display the agreement to the user when paying the specified part of the estimated price to the user. In other words, the server can display the agreement in a plurality of occasions. A specific occasion can be determined based on an actual service demand. Details are omitted here for simplicity.

It can be seen from the previously described method that the article to be estimated can be rapidly estimated by comparing and analyzing the actual picture and the standard picture after the actual picture and the standard picture of the article to be estimated are obtained, thereby effectively improving article estimation efficiency.

Figure 2:
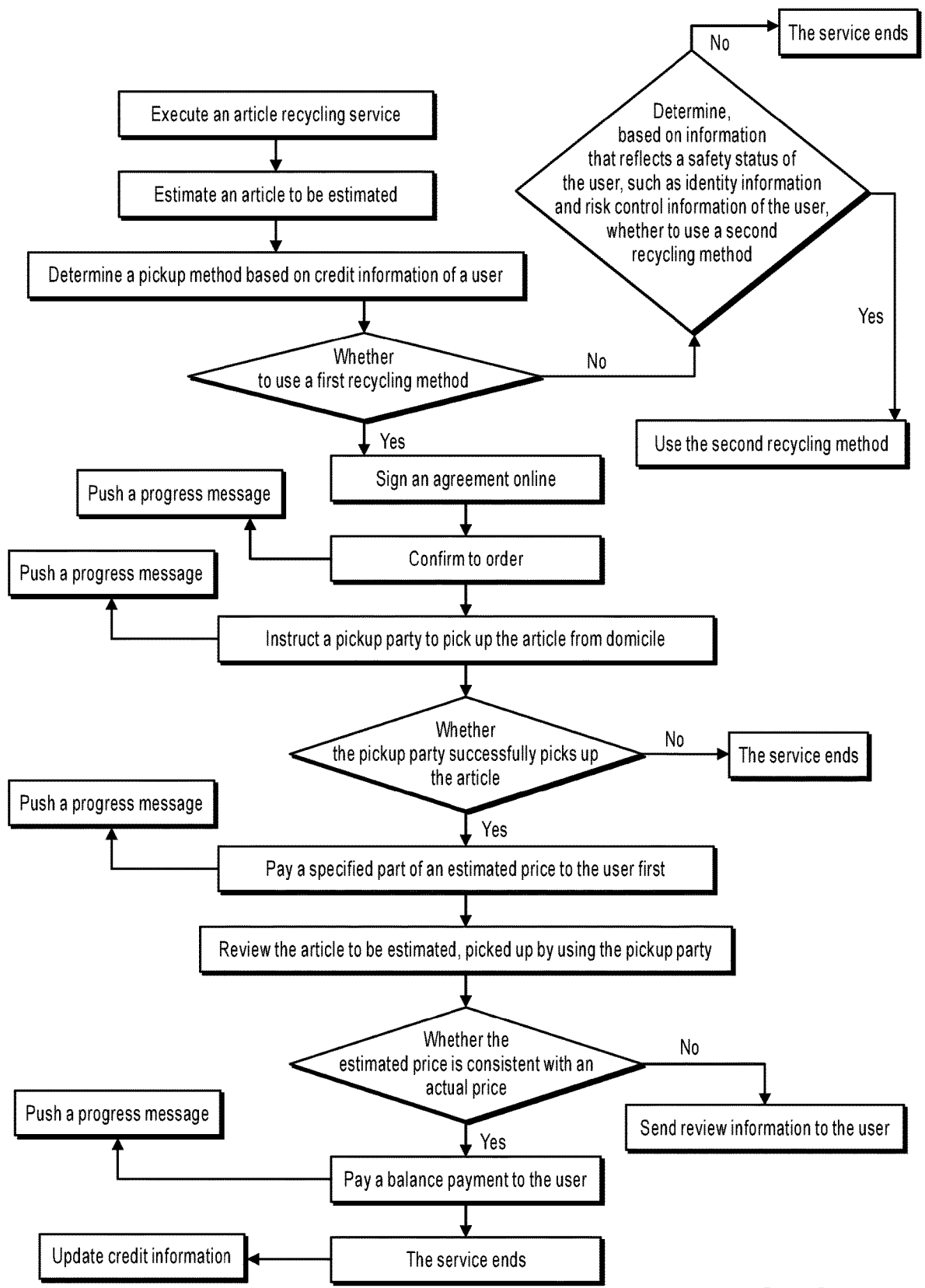
FIG. 2 is a schematic diagram illustrating a process of executing an entire article recycling service, according to the present specification.

To further describe processes involved in entire article estimation, as shown in FIG. 2, the process of executing the entire article recycling service is described in a specific order below by still using the article recycling service scenario as an example.

FIG. 2 is a schematic diagram illustrating a process of executing an entire article recycling service, according to the present specification.

When determining that a user performs an article recycling service, a server can estimate an article to be estimated. The server can determine the article to be estimated and obtain an actual picture of the article to be estimated based on received article information. The server can determine a standard picture of the article to be estimated from a predetermined graphics library, and then estimate the article to be estimated based on the standard picture and the actual picture of the article to be estimated.

After estimating the article to be estimated, the server can determine, based on credit information of the user, a pickup method used to pick up the article to be estimated by using a pickup party. When determining, based on the credit information of the user, that a credit limit of the user is not less than a specified credit limit, the server determines to recycle the article to be estimated by using the pickup party by using a first recycling method. When determining that the credit limit of the user is less than the specified credit limit, the server can determine, based on information that can reflect a safety status of the user, such as identity information and risk control information of the user, whether the user is a risky user. When determining that the user is a risky user, the server can directly end the entire article recycling service. When determining that the user is a safe user, the server can determine to recycle the article to be estimated by using the pickup party by using a second recycling method. A process of recycling the article by using the first recycling method is first described below, and a process of recycling the article by using the second recycling method is subsequently described.

The server can display an agreement about the article recycling service to the user by using an end-user device or a client, and prompt the user to sign the agreement, to perform a subsequent process of the article recycling service. When detecting that the user determines to execute the article recycling service based on an estimated price of the article to be estimated, the server determines that the user performs an ordering operation, and instructs the pickup party to pick up the article from domicile based on address information of the user. When successfully picking up the article to be estimated from the user, the pickup party can send a pickup success message to the server, so that the server determines that the pickup party successfully picks up the article to be estimated from the user, and first pays a specified part of the estimated price of the article to be estimated to the user. When determining that the pickup party fails to pick up the article to be estimated from the user (to be specific, the pickup party sends a pickup failure message to the server), the server ends the article recycling service.

A reviewer can obtain the article to be estimated by using the pickup party, and review the article to be estimated, to obtain an actual price of the article to be estimated. The reviewer can input the actual price and a cause for the actual price to the server, and the server can determine, based on the actual price, whether the actual price is consistent with the estimated price of the article to be estimated. If yes, the server can pay a balance payment of the estimated price to the user, update the credit information of the user, and end the entire article recycling service. When determining that the estimated price of the article to be estimated is inconsistent with the actual price, the server can generate review information based on the actual price and the cause for the actual price (certainly, the server can generate the review information based on other information), and send the review information to the user.

In the previous process, the server can push a message about an entire service execution progress to the user based on the process of executing the article recycling service, so that the user learns of, in real time based on the message pushed by the server, the progress of executing the entire article recycling service.

Figure 3:
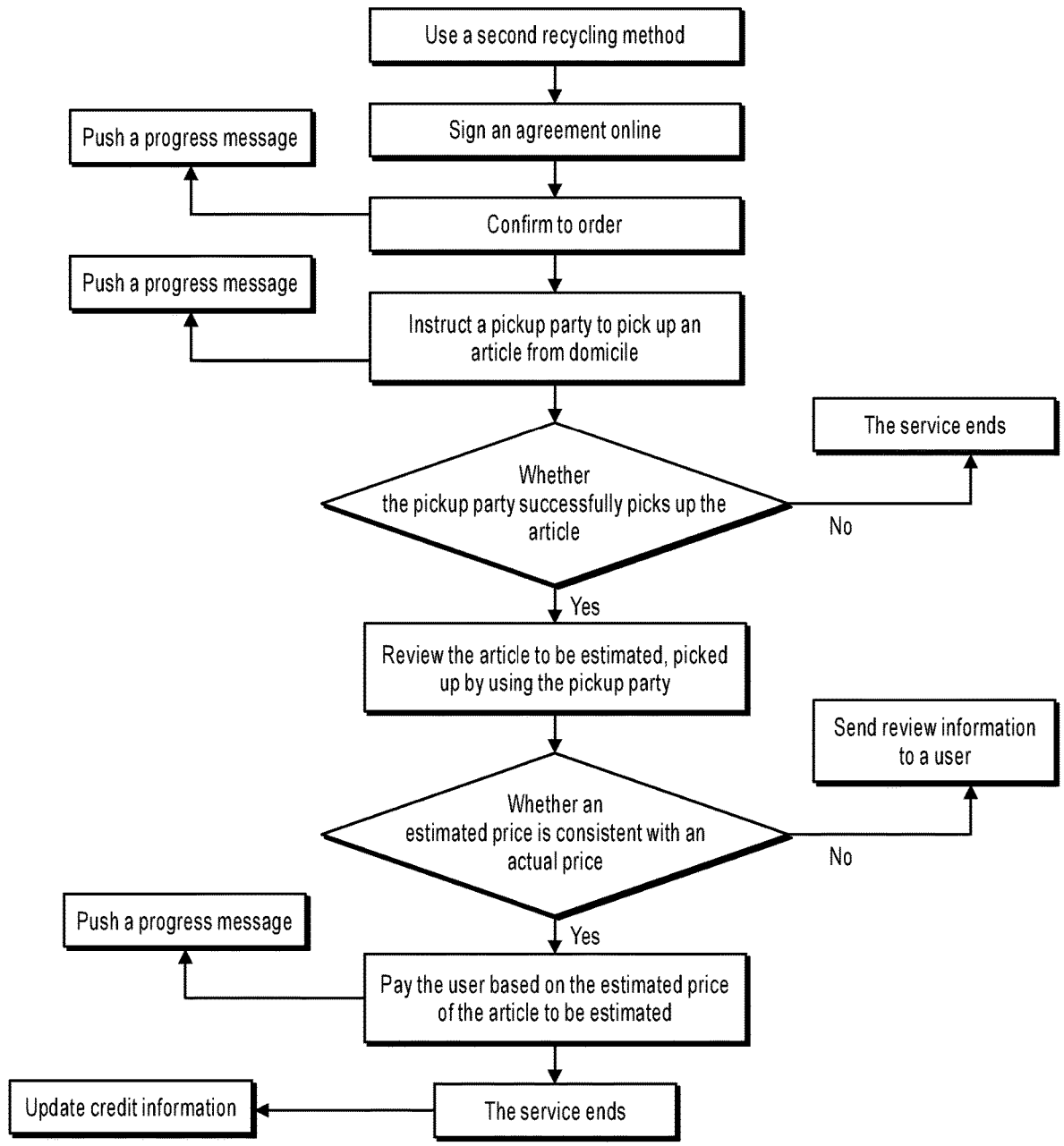
FIG. 3 is a schematic diagram illustrating a process of executing, by a server, an article recycling service by using a second recycling method, according to the present specification.

How the user continues to execute the article recycling service based on the review information is subsequently described. As shown in FIG. 3, the process of executing, by the server, the article recycling service by using the second recycling method is described below.

FIG. 3 is a schematic diagram illustrating a process of executing, by a server, an article recycling service by using a second recycling method, according to the present specification.

It can be seen from FIG. 3 that the process of executing, by the server, the article recycling service by using the second recycling method is basically the same as the process of executing, by the server, the article recycling service by using the first recycling method. A main difference lies in that the reviewer needs to first review the article to be estimated before the server pays the user. In other words, the first recycling method can be understood as "payment before inspection", and the second recycling method can be understood as "inspection before payment".

Figure 4:
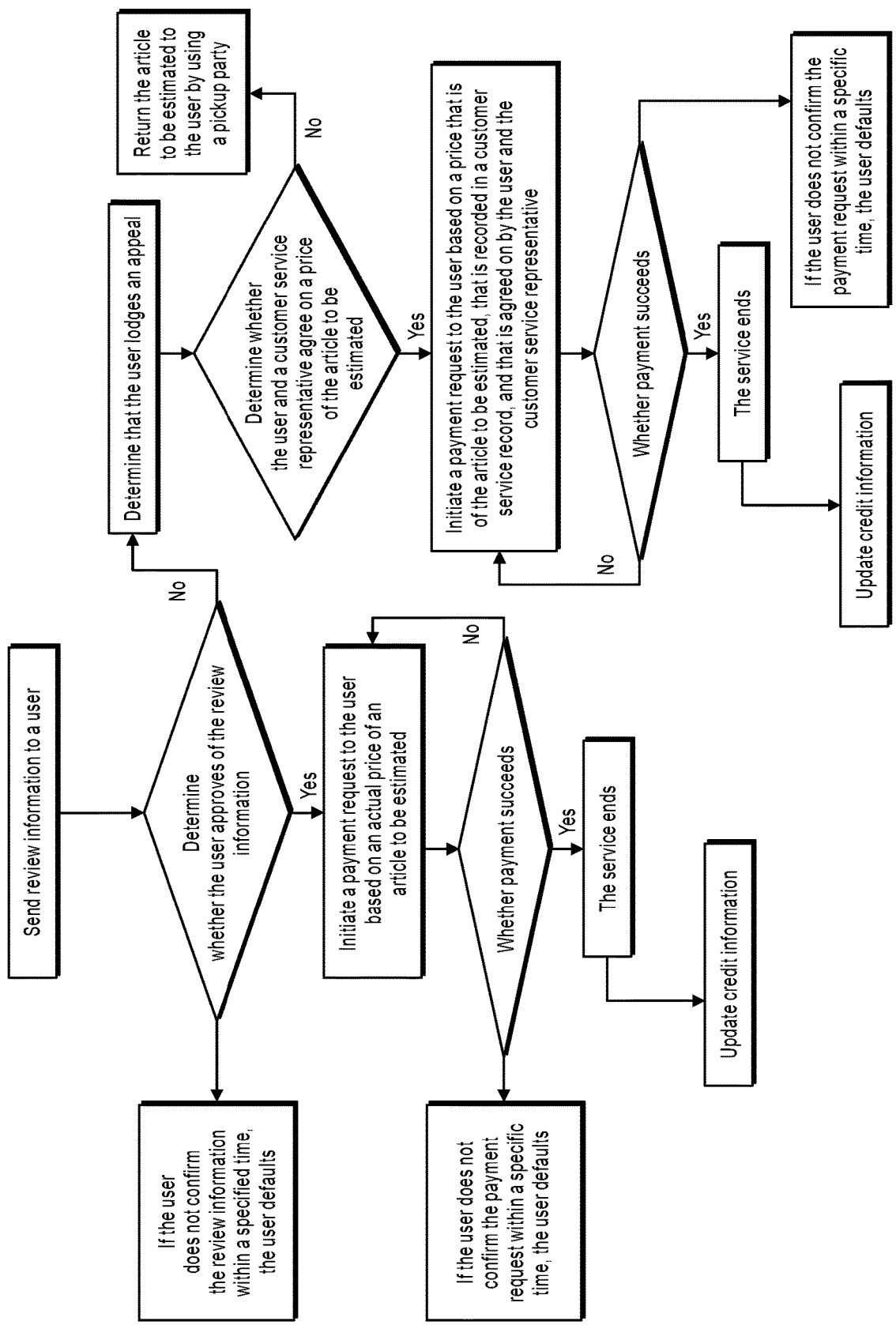
FIG. 4 is a schematic diagram illustrating a process of executing, by a user, an article recycling service based on review information sent by a server, according to the present specification.

FIG. 4 is a schematic diagram illustrating a process of executing, by a user, an article recycling service based on review information sent by a server, according to the present specification.

After receiving, by using the end-user device or the client, the review information sent by the server, the user can determine, based on the actual price of the article to be estimated and the cause for the actual price that are included in the review information, whether to approve of the review result. When determining that the user approves of the review information, the server can initiate a payment request to the user based on the actual price of the article to be estimated, pay the user based on the actual price of the article to be estimated after determining that the user confirms the payment request, and end the article recycling service after updating the credit information of the user. The server can pay the user based on a principle of "refund for any overpayment and a supplemental payment for any deficiency". To be specific, when determining that the actual price is less than the previously-paid specified part of the estimated price of the article to be estimated, the server can deduct, from an account of the user, a difference obtained by subtracting the actual price from the specified part of the estimated price. When determining that the actual price is greater than the previously-paid specified part of the estimated price, the server can pay a difference obtained by subtracting the specified part of the estimated price from the actual price to the user. Certainly, if the server executes the article recycling service by using the second recycling method, the server can directly pay the user based on the actual price.

When detecting that the user still does not confirm the review information within a specified time (to be specific, within the specified time, the user performs neither a related operation indicating that the user approves of the review information nor a related operation indicating that the user disapproves of the review information), the server can determine that the user defaults, and then take some penalty measures based on the default, for example, deducts a specific amount when paying the user or decreases the credit limit of the user.

When detecting that payment to the user fails, the server can send the payment request to the user again at intervals of a time period. When detecting that the user does not return an agreement after a specific time although the payment request is successfully sent to the user, the server can determine that the user defaults, and then take a specific penalty measure for the user in a subsequent process.

When receiving an appeal lodged by the user against the review information, the server can determine that the user disapproves of the review information, and perform objection processing. In an objection processing process, the server can send a message to a customer service representative, to instruct, by using the message, the customer service representative to contact the user and negotiate with the user. The server can determine, based on a customer service record generated after the user negotiates with the customer service representative, whether the user and the customer service representative reach an agreement. If yes, the server can pay the user based on a price that is of the article to be estimated, that is recorded in the customer service record, and that is agreed on by the user and the customer service representative. The server can initiate a payment request to the user based on the agreed price, update the credit information of the user when determining that payment succeeds, and end the entire article recycling service. When determining, based on the customer service record, that the user and the customer service representative do not agree on a price of the article to be estimated, the server can return the article to be estimated to the user by using the pickup party.

Likewise, when detecting that payment to the user fails, the server can send the payment request to the user again at intervals of a time period. When detecting that the user does not return an agreement after a specific time although the payment request is successfully sent to the user, the server can determine that the user defaults, and subsequently take a specific penalty measure for the user.

It is worthwhile to note that in the previously described article recycling process, the server can first determine whether the credit limit of the user is not less than the specified credit limit. When determining that the credit limit of the user is not less than the specified credit limit, the server can prompt, by using the end-user device, the user to send the article information of the article to be estimated and the actual picture of the article to be estimated to the server, and then estimate the article to be estimated based on the obtained article information and actual picture.

When determining that the credit limit of the user is less than the specified credit limit, the server does not estimate the article to be estimated, and can directly send a pickup message to the pickup party, so that the pickup party can pick up the article from domicile based on the address information of the user after receiving the pickup message. The pickup party can send the picked-up article to be estimated to the reviewer for review. The reviewer can determine the actual price of the article to be estimated by reviewing the article to be estimated from every aspect, and input the actual price to the server. The server can pay the user based on the actual price.

Certainly, when determining that the credit limit of the user is less than the specified credit limit, the server can estimate the article to be estimated and display the estimated price of the article to be estimated based on the received article information of the article to be estimated and the obtained actual picture of the article to be estimated. When the credit limit of the user is less than the specified credit limit, the server pays the user based on the actual price that is of the article to be estimated and that is determined by the reviewer. Therefore, the server displays the estimated price of the article to be estimated to the user by using the end-user device, so that the user can learn of an approximate price at which the article to be estimated is finally recycled.

It is worthwhile to further note that the article estimation method provided in the present specification is described above in the article recycling scenario. However, the article estimation method is not limited to the article recycling scenario, and is also applicable to scenarios such as article pledge, article transfer, and article mortgage. The method is applicable to mortgage of an article that is easy to pick up, for example, a mobile phone, a computer, or a car. In a process of executing an article mortgage service, regardless of whether the server pays an amount to a user based on an estimated price of an article to be estimated or an actual price of the article to be estimated, when determining that the user repays the corresponding amount, the server needs to send, to the pickup party, a message instructing the pickup party to return the article to be estimated to the user, so that the pickup party returns the article to be estimated to the user based on the message.

The article estimation method provided in the one or more implementations of the present specification is described above. Based on the same idea, as shown in FIG. 5, the present specification further provides an article estimation apparatus.

Figure 5:
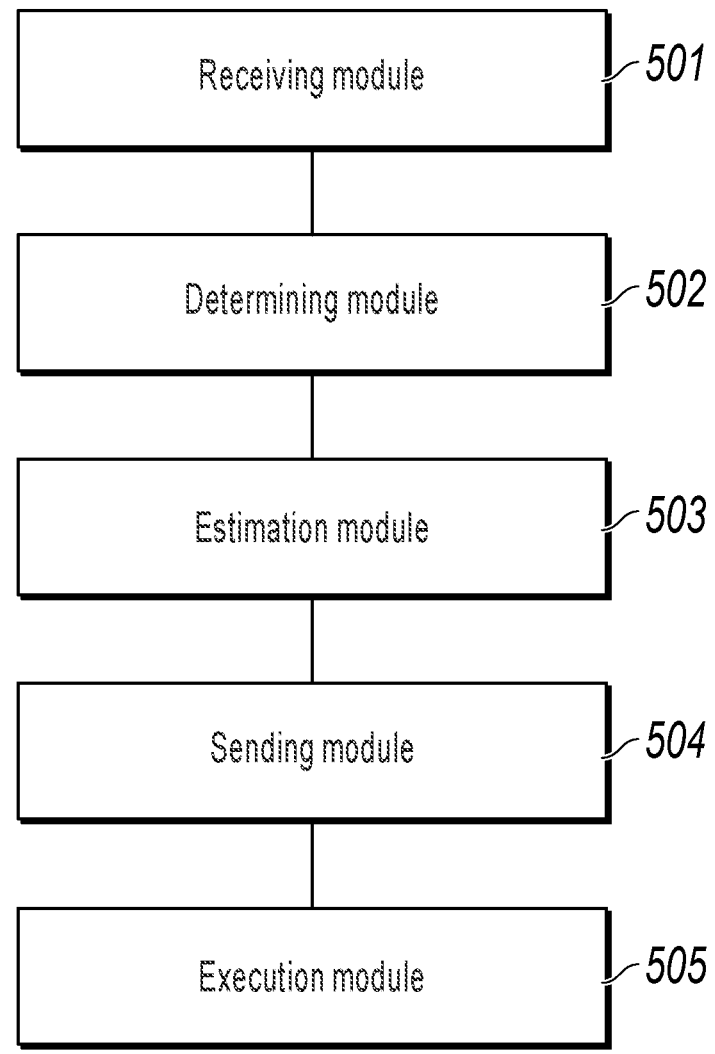
FIG. 5 is a schematic diagram illustrating an article estimation apparatus, according to the present specification.

FIG. 5 is a schematic diagram illustrating an article estimation apparatus, according to the present specification. The apparatus includes: a receiving module 501, configured to receive article information of an article to be estimated, and obtain an actual picture of the article to be estimated; a determining module 502, configured to determine a standard picture of the article to be estimated from a predetermined graphics library based on the article information; and an estimation module 503, configured to estimate the article to be estimated based on the standard picture and the actual picture.

The estimation module 503 is configured to determine damage assessment information of the article to be estimated based on the standard picture and the actual picture, and estimate the article to be estimated based on the damage assessment information.

The estimation module 503 is configured to input the standard picture and the actual picture to a predetermined model, and obtain a comparison result output by the model, where the model is used to compare the standard picture and the actual picture, determine the damage assessment information of the article to be estimated based on the comparison result, and output the damage assessment information.

The apparatus further includes: a sending module 504, configured to send an installation package corresponding to evaluation software to the article to be estimated when the article to be estimated is an electronic device, so that the article to be estimated installs the evaluation software by using the installation package, and determines evaluation information of the article to be estimated by using the evaluation software; and obtain the evaluation information.

The sending module 504 is configured to obtain the evaluation information sent by the article to be estimated; or obtain a picture that includes the evaluation information, and determine the evaluation information based on the picture that includes the evaluation information.

The estimation module 503 is configured to estimate the article to be estimated based on the standard picture, the actual picture, and the evaluation information, or based on the evaluation information.

The apparatus further includes: an execution module 505, configured to execute a service based on an estimated price, where the service includes at least one of article recycling and article pledge.

The execution module 505 is configured to determine a credit limit of a user; determine an amount less than the estimated price based on the estimated price when determining that the credit limit of the user is not less than a specified credit limit; and pay the amount to the user, and generate a pickup message, where the pickup message is used to instruct a pickup party to pick up the article to be estimated.

Figure 6:
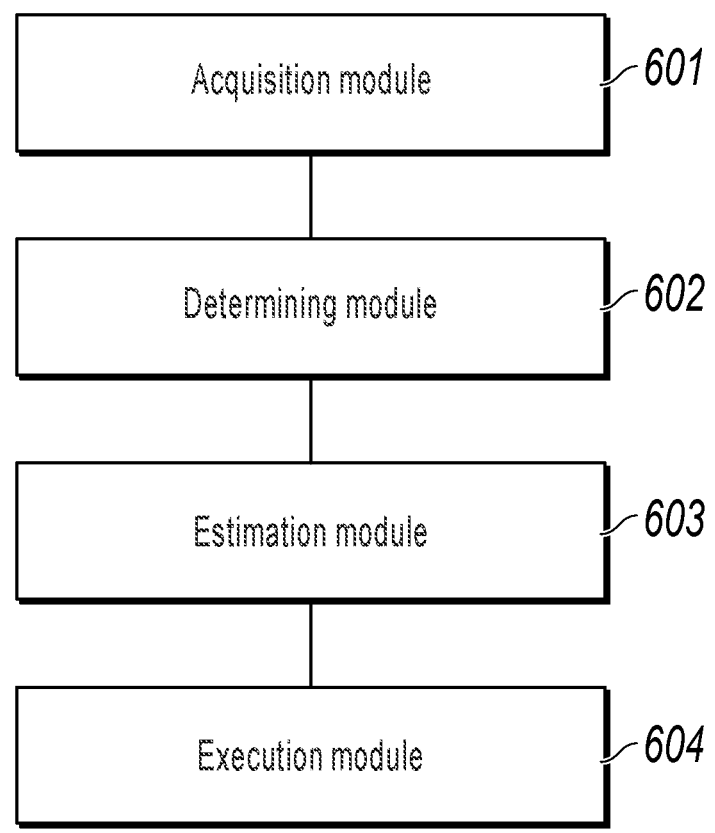
FIG. 6 is a schematic diagram illustrating a service execution apparatus, according to the present specification.

As shown in FIG. 6, the present specification further provides a service execution apparatus.

FIG. 6 is a schematic diagram illustrating a service execution apparatus, according to the present specification. The apparatus includes: an acquisition module 601, configured to receive article information that is of an article to be estimated and that is sent by a user, and obtain an actual picture of the article to be estimated; a determining module 602, configured to determine a standard picture of the article to be estimated from a predetermined graphics library based on the article information; an estimation module 603, configured to estimate the article to be estimated based on the standard picture and the actual picture; and an execution module 604, configured to execute a service based on a credit limit of the user and an estimated price of the article to be estimated.

The service includes at least one of article recycling and article pledge.

The execution module 604 is configured to determine an amount less than the estimated price based on the estimated price when determining that the credit limit of the user is not less than a specified credit limit; and pay the amount to the user, and generate a pickup message, where the pickup message is used to instruct a pickup party to pick up the article to be estimated.

Figure 7:
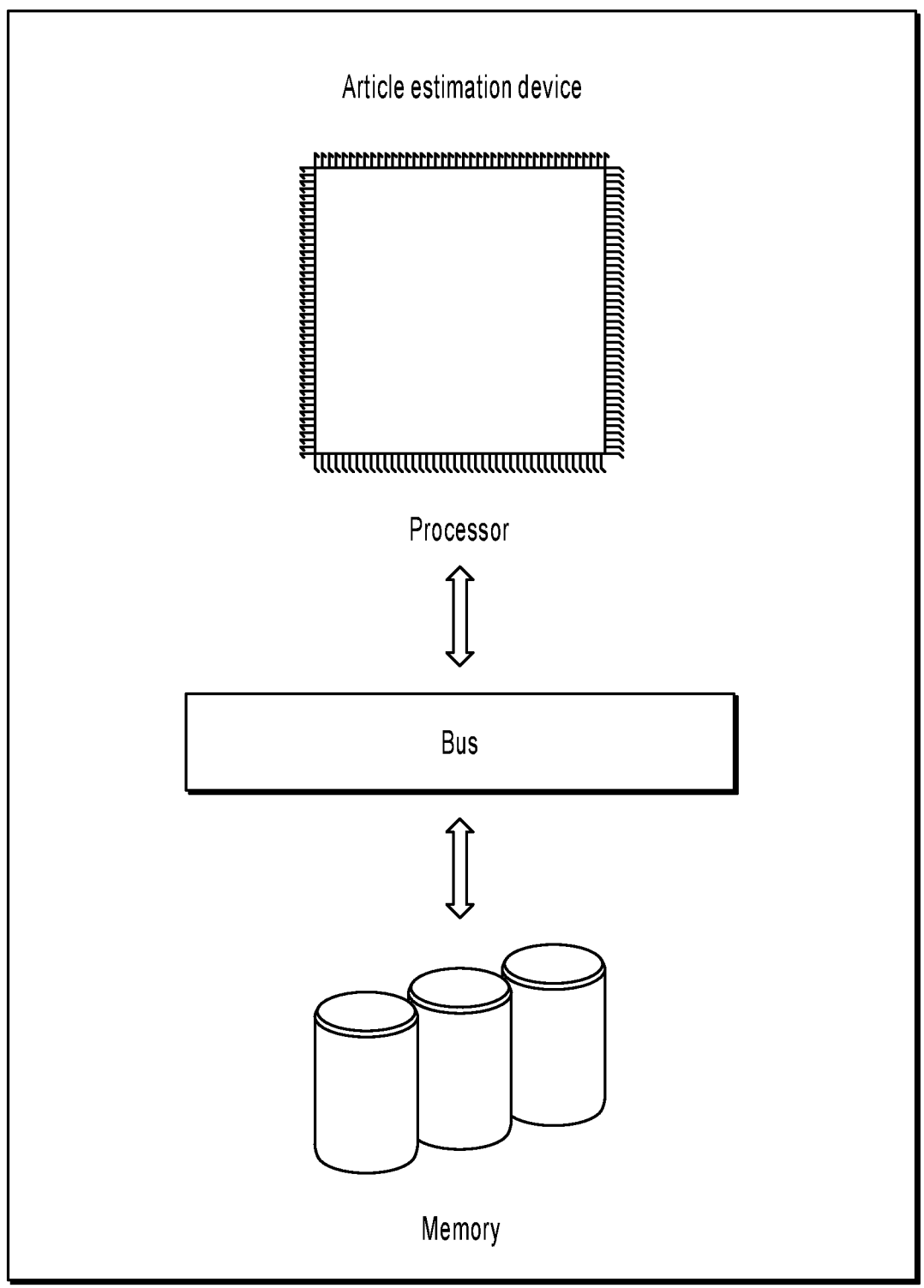
FIG. 7 is a schematic diagram illustrating an article estimation device, according to the present specification.

Based on the previously described article estimation method, as shown in FIG. 7, the present specification further correspondingly provides an article estimation device. The article estimation device includes one or more processors and memories. The memory stores a program, and the program is executed by the one or more processors to perform the following steps: receiving article information of an article to be estimated, and obtaining an actual picture of the article to be estimated; determining a standard picture of the article to be estimated from a predetermined graphics library based on the article information; and estimating the article to be estimated based on the standard picture and the actual picture.

Figure 8:
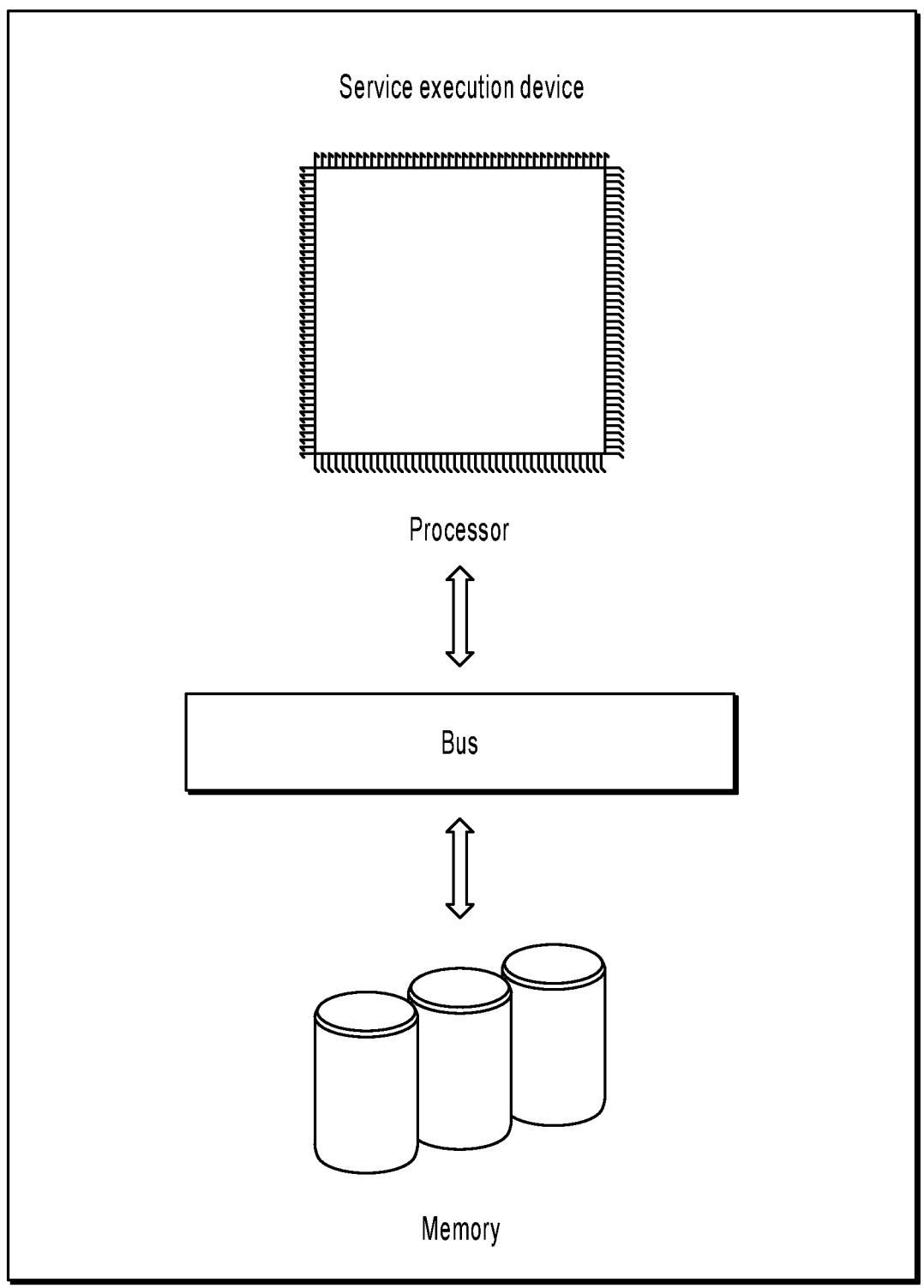
FIG. 8 is a schematic diagram illustrating a service execution device, according to the present specification.

Based on the previously described service execution method, as shown in FIG. 8, the present specification further correspondingly provides a service execution device. The service execution device includes one or more processors and memories. The memory stores a program, and the program is executed by the one or more processors to perform the following steps: receiving article information that is of an article to be estimated and that is sent by a user, and obtaining an actual picture of the article to be estimated; determining a standard picture of the article to be estimated from a predetermined graphics library based on the article information; estimating the article to be estimated based on the standard picture and the actual picture; and executing a service based on a credit limit of the user and an estimated price of the article to be estimated.

In one or more implementations of the present specification, the standard picture of the article to be estimated can be determined from the predetermined graphics library based on the received article information of the article to be estimated, and the article to be estimated is estimated based on the obtained actual picture of the article to be estimated and the determined standard picture. The article to be estimated can be rapidly estimated by comparing and analyzing the actual picture and the standard picture after the actual picture and the standard picture of the article to be estimated are obtained, thereby improving article estimation efficiency.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system into a PLD without requesting a chip manufacturer to design and manufacture an application-specific integrated circuit chip. In addition, at present, instead of manually manufacturing an integrated circuit chip, this type of programming is mostly implemented by using "logic compiler" software. The "logic compiler" software is similar to a software compiler used to develop and write a program. Original code needs to be written in a particular programming language before being compiled. The language is referred to as hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Very-high-speed integrated circuit hardware description language (VHDL) and Verilog are most commonly used at present. A person skilled in the art should also understand that a hardware circuit that implements a logical method procedure can be readily obtained provided that the method procedure is logically programmed by using several of the previous described hardware description languages and is programmed into an integrated circuit.

A controller can be implemented by using any appropriate method. For example, the controller can be in a form of a microprocessor, a processor, a computer readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. A memory controller can alternatively be implemented as a part of control logic of a memory. A person skilled in the art also knows that, in addition to implementing the controller by using the computer readable program code, method steps can be logically programmed to enable the controller to implement the same function in the form of the logic gate, the switch, the application-specific integrated circuit, the programmable logic controller, or the built-in microcontroller. Therefore, the controller can be considered as a hardware component, and an apparatus that is included in the controller and configured to implement various functions can also be considered as a structure in the hardware component. Alternatively, the apparatus configured to implement various functions can even be considered as both a software module for implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the previous apparatus is described by dividing the apparatus into various units based on functions. Certainly, when the solutions provided in the present specification are implemented, the functions of the units can be implemented in one or more pieces of software and/or hardware.

A person skilled in the art should understand that the implementations of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer usable storage media (including but not limited to a magnetic disk memory, a CD-ROM, and an optical memory) that include computer usable program code.

The present specification is described with reference to the flowcharts and/or block diagrams of the method, the device (system), and the computer program product according to the one or more implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a nonvolatile memory, and/or another form of memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a magnetic cassette, a magnetic tape, a magnetic disk storage or another magnetic storage device, or any other non-transmission medium that can be used to store information accessible to the computing device. Based on the definition in the present specification, the computer readable medium does not include transitory computer readable media (transitory media) such as a modulated data signal and carrier.

It is worthwhile to further note that, the terms "include", "comprise", or any other variants thereof are intended to cover a non-exclusive inclusion, so that a process, a method, a product, or a device that includes a list of elements not only includes those elements but also includes other elements that are not expressly listed, or further includes elements inherent to such process, method, product, or device. Without more constraints, an element preceded by "includes a . . . " does not preclude the existence of additional identical elements in the process, method, product, or device that includes the element.

The present specification can be described in the general context of computer executable instructions executed by a computer, for example, a program module. Generally, the program module includes a routine, a program, an object, a component, a data structure, etc. for executing a specific task or implementing a specific abstract data type. The one or more implementations of the present specification can also be practiced in distributed computing environments. In the distributed computing environments, tasks are performed by remote processing devices that are connected through a communications network. In a distributed computing environment, the program module can be located in both local and remote computer storage media including storage devices.

The implementations in the present specification are described in a progressive way. For same or similar parts of the implementations, mutual references can be made to the implementations. Each implementation focuses on a difference from other implementations. Particularly, a system implementation is basically similar to a method implementation, and therefore is described briefly. For related parts, references can be made to related descriptions in the method implementation.

Specific implementations of the present application are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily require a particular execution order to achieve the desired results. In some implementations, multi-tasking and parallel processing can be advantageous.

The previous descriptions are merely one or more implementations of the present specification, and are not intended to limit the present specification. For a person skilled in the art, various modifications and changes can be made to the one or more implementations of the present specification. Any modification, equivalent replacement, improvement, etc. made within the spirit and the principle of the one or more implementations of the present specification shall fall within the scope of the claims in the present specification.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for article estimation, comprising:
   receiving, by a server and from an end-user device operated by a user, article information of an article to be estimated;
   determining, by the server and based on credit information of the user, that the user is not a risky user, wherein the credit information of the user includes a credit limit of the user;
   obtaining, by the server and from the end-user device, an actual picture of the article;
   determining, by the server, a standard picture of the article from a predetermined graphics library based on the article information, wherein the predetermined graphics library includes standard pictures of a plurality of articles from a plurality of angles, and the standard picture of the article includes a picture of the article in an intact state, in a state in which a scratch exists on a surface of the article, or in a state in which a disassembly trace exists on the surface of the article;
   obtaining, by the server, an actual performance of the article, wherein obtaining the actual performance of the article comprises:
      sending, by the server, an installation package corresponding to an evaluation software to the end-user device in response to determining that the article is an electronic device, wherein the article obtains the installation package from the end-user device, installs the evaluation software by using the installation package, determines evaluation information of the article by using the evaluation software, and sends the evaluation information to the end-user device; and
      obtaining, by the server, the evaluation information from the end-user device, wherein the evaluation information comprises the actual performance of the article;
   determining, by the server, a value of the article based on the standard picture, the actual picture, and the actual performance of the article, wherein determining the value of the article comprises:
      determining the value of the article based on the standard picture and the actual picture; and
      in response to determining that the actual performance of the article is higher than benchmark performance of the article, increasing the value of the article by a first predetermined amount; or
      in response to determining that the actual performance of the article is lower than the benchmark performance of the article, decreasing the value of the article by a second predetermined amount; and
   after determining the value of the article, determining, by the server and based on the credit information of the user, a pickup method to pick up the article from the user, wherein determining the pickup method includes:
      using a first recycling method as the pickup method in response to determining that the credit limit of the user is not less than a specified credit limit; and
      using a second recycling method as the pickup method in response to determining that the credit limit of the user is less than the specified credit limit.

2. The method according to claim 1, wherein determining the value of the article based on the standard picture and the actual picture comprises:
   determining damage assessment information of the article based on the standard picture and the actual picture, wherein the damage assessment information of the article comprises at least one of scratch information, disassembly trace information, or watermark information; and
   determining a damage status of the article based on the damage assessment information.

3. The method according to claim 2, wherein determining damage assessment information of the article based on the standard picture and the actual picture comprises:
   inputting the standard picture and the actual picture to a predetermined model; and
   obtaining a comparison result output by the predetermined model, wherein the predetermined model is used to compare the standard picture and the actual picture to determine the damage assessment information of the article based on the comparison result and to output the damage assessment information.

4. The method according to claim 1, wherein obtaining the evaluation information comprises:
  obtaining the evaluation information sent by the article; or
  obtaining a picture that comprises the evaluation information, and determining the evaluation information based on the picture that comprises the evaluation information.

5. The method according to claim 1, wherein the method further comprises:
  executing a service based on the value of the article.

6. The method according to claim 5, wherein executing the service comprises:
  determining a credit limit of the user;
  determining an amount less than the value of the article when determining that the credit limit of the user is not less than a specified credit limit;
  paying the amount to the user; and
  generating a pickup message, wherein the pickup message is used to instruct a pickup party to pick up the article.

7. The method according to claim 6, wherein the article is a mobile phone, a computer, or a car, wherein determining the credit limit of the user comprises processing user information, and wherein the user information comprises identity information and risk control information of the user.

8. A non-transitory, computer-readable medium storing one or more instructions executable by a computer system to perform operations comprising:
  receiving, by a server and from an end-user device operated by a user, article information of an article to be estimated;
  determining, by the server and based on credit information of the user, that the user is not a risky user, wherein the credit information of the user includes a credit limit of the user;
  obtaining, by the server and from the end-user device, an actual picture of the article;
  determining, by the server, a standard picture of the article from a predetermined graphics library based on the article information, wherein the predetermined graphics library includes standard pictures of a plurality of articles from a plurality of angles, and the standard picture of the article includes a picture of the article in an intact state, in a state in which a scratch exists on a surface of the article, or in a state in which a disassembly trace exists on the surface of the article;
  obtaining, by the server, an actual performance of the article, wherein obtaining the actual performance of the article comprises:
    sending, by the server, an installation package corresponding to an evaluation software to the end-user device in response to determining that the article is an electronic device, wherein the article is configured to obtain the installation package from the end-user device, install the evaluation software by using the installation package, determine evaluation information of the article by using the evaluation software, and send the evaluation information to the end-user device; and
    obtaining, by the server, the evaluation information from the end-user device, wherein the evaluation information comprises the actual performance of the article;
  determining, by the server, a value of the article based on the standard picture, the actual picture, and the actual performance of the article, wherein determining the value of the article comprises:
    determining the value of the article based on the standard picture and the actual picture; and
    in response to determining that the actual performance of the article is higher than benchmark performance of the article, increasing the value of the article by a first predetermined amount; or
    in response to determining that the actual performance of the article is lower than the benchmark performance of the article, decreasing the value of the article by a second predetermined amount; and
  after determining the value of the article, determining, by the server and based on the credit information of the user, a pickup method to pick up the article from the user, wherein determining the pickup method includes:
    using a first recycling method as the pickup method in response to determining that the credit limit of the user is not less than a specified credit limit; and
    using a second recycling method as the pickup method in response to determining that the credit limit of the user is less than the specified credit limit.

9. The non-transitory, computer-readable medium according to claim 8, wherein determining the value of the article based on the standard picture and the actual picture comprises:
  determining damage assessment information of the article based on the standard picture and the actual picture, wherein the damage assessment information of the article comprises at least one of scratch information, disassembly trace information, or watermark information; and
  determining a damage status of the article based on the damage assessment information.

10. The non-transitory, computer-readable medium according to claim 9, wherein determining damage assessment information of the article based on the standard picture and the actual picture comprises:
  inputting the standard picture and the actual picture to a predetermined model; and
  obtaining a comparison result output by the predetermined model, wherein the predetermined model is used to compare the standard picture and the actual picture to determine the damage assessment information of the article based on the comparison result and to output the damage assessment information.

11. The non-transitory, computer-readable medium according to claim 8, wherein obtaining the evaluation information comprises:
  obtaining the evaluation information sent by the article; or
  obtaining a picture that comprises the evaluation information, and determining the evaluation information based on the picture that comprises the evaluation information.

12. The non-transitory, computer-readable medium according to claim 8, wherein the operations further comprises:
  executing a service based on the value of the article.

13. The non-transitory, computer-readable medium according to claim 12, wherein executing the service comprises:
  determining a credit limit of the user;
  determining an amount less than the value of the article when determining that the credit limit of the user is not less than a specified credit limit;
  paying the amount to the user; and
  generating a pickup message, wherein the pickup message is used to instruct a pickup party to pick up the article.

14. The non-transitory, computer-readable medium according to claim 13, wherein the article is a mobile phone, a computer, or a car, wherein determining the credit limit of the user comprises processing user information, and wherein the user information comprises identity information and risk control information of the user.

15. A computer-implemented system, comprising:
one or more computers; and
one or more computer memory devices coupled with the one or more computers and having tangible, non-transitory, machine-readable media storing one or more instructions that, when executed by the one or more computers, perform one or more operations comprising:
receiving, by a server and from an end-user device operated by a user, article information of an article to be estimated;
determining, by the server and based on credit information of the user, that the user is not a risky user, wherein the credit information of the user includes a credit limit of the user;
obtaining, by the server and from the end-user device, an actual picture of the article;
determining, by the server, a standard picture of the article from a predetermined graphics library based on the article information, wherein the predetermined graphics library includes standard pictures of a plurality of articles from a plurality of angles, and the standard picture of the article includes a picture of the article in an intact state, in a state in which a scratch exists on a surface of the article, or in a state in which a disassembly trace exists on the surface of the article;
obtaining, by the server, an actual performance of the article, wherein obtaining the actual performance of the article comprises:
sending, by the server, an installation package corresponding to an evaluation software to the end-user device in response to determining that the article is an electronic device, wherein the article is configured to obtain the installation package from the end-user device, install the evaluation software by using the installation package, determine evaluation information of the article by using the evaluation software, and send the evaluation information to the end-user device; and
obtaining, by the server, the evaluation information from the end-user device, wherein the evaluation information comprises the actual performance of the article;
determining, by the server, a value of the article based on the standard picture, the actual picture, and the actual performance of the article, wherein determining the value of the article comprises:
determining the value of the article based on the standard picture and the actual picture; and
in response to determining that the actual performance of the article is higher than benchmark performance of the article, increasing the value of the article by a first predetermined amount; or
in response to determining that the actual performance of the article is lower than the benchmark performance of the article, decreasing the value of the article by a second predetermined amount; and
after determining the value of the article, determining, by the server and based on the credit information of the user, a pickup method to pick up the article from the user, wherein determining the pickup method includes:
using a first recycling method as the pickup method in response to determining that the credit limit of the user is not less than a specified credit limit; and
using a second recycling method as the pickup method in response to determining that the credit limit of the user is less than the specified credit limit.

16. The computer-implemented system according to claim 15, wherein determining the value of the article based on the standard picture and the actual picture comprises:
determining damage assessment information of the article based on the standard picture and the actual picture, wherein the damage assessment information of the article comprises at least one of scratch information, disassembly trace information, or watermark information; and
determining a damage status of the article based on the damage assessment information.

17. The computer-implemented system according to claim 16, wherein determining damage assessment information of the article based on the standard picture and the actual picture comprises:
inputting the standard picture and the actual picture to a predetermined model; and
obtaining a comparison result output by the predetermined model, wherein the predetermined model is used to compare the standard picture and the actual picture to determine the damage assessment information of the article based on the comparison result and to output the damage assessment information.

18. The computer-implemented system according to claim 15, wherein the operations further comprises:
executing a service based on the value of the article.

19. The computer-implemented system according to claim 18, wherein executing the service comprises:
determining a credit limit of the user;
determining an amount less than the value of the article when determining that the credit limit of the user is not less than a specified credit limit;
paying the amount to the user; and
generating a pickup message, wherein the pickup message is used to instruct a pickup party to pick up the article.

* * * * *